(12) United States Patent
Mishima

(10) Patent No.: US 12,505,390 B2
(45) Date of Patent: Dec. 23, 2025

(54) OPERATION MANAGEMENT APPARATUS AND OPERATION MANAGEMENT METHOD

(71) Applicant: ISUZU MOTORS LIMITED, Tokyo (JP)

(72) Inventor: Yasuyuki Mishima, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 272 days.

(21) Appl. No.: 18/363,372

(22) Filed: Aug. 1, 2023

(65) Prior Publication Data

US 2024/0086794 A1 Mar. 14, 2024

(30) Foreign Application Priority Data

Sep. 9, 2022 (JP) .................................. 2022-143861

(51) Int. Cl.
*G06Q 10/0631* (2023.01)

(52) U.S. Cl.
CPC .............................. *G06Q 10/06311* (2013.01)

(58) Field of Classification Search
CPC ........................................... G06Q 10/00–50/00
USPC ................................................ 705/7.11–7.42
See application file for complete search history.

(56) References Cited

U.S. PATENT DOCUMENTS

| | | | |
|---|---|---|---|
| 3,582,876 A * | 6/1971 | Carmack .................. | G08G 1/08 340/925 |
| 6,546,371 B1 * | 4/2003 | Doner .................. | G06Q 10/047 701/19 |
| 6,823,315 B1 * | 11/2004 | Bucci ..................... | G06Q 10/06 705/7.21 |
| 9,679,478 B2 * | 6/2017 | Wu .......................... | G08G 1/02 |
| 11,531,939 B1 * | 12/2022 | Yang ................ | G06Q 10/06315 |
| 2001/0051888 A1 * | 12/2001 | Mayhak, Jr. ........... | G16H 40/20 705/7.14 |
| 2015/0104071 A1 * | 4/2015 | Martin ................... | G08G 1/202 382/104 |
| 2015/0242781 A1 * | 8/2015 | Mancuso ......... | G06Q 10/06312 705/7.22 |

(Continued)

FOREIGN PATENT DOCUMENTS

| | | |
|---|---|---|
| JP | 2021-026696 A | 2/2021 |
| WO | 2021-192105 A1 | 9/2021 |

OTHER PUBLICATIONS

Fayazi, Seyed Alireza, and Ardalan Vahidi. "Mixed-integer linear programming for optimal scheduling of autonomous vehicle intersection crossing." IEEE Transactions on Intelligent Vehicles 3.3 (2018): 287-299. (Year: 2018).*

(Continued)

*Primary Examiner* — Alan S Miller
(74) *Attorney, Agent, or Firm* — PROCOPIO, CORY, HARGREAVES & SAVITCH LLP

(57) ABSTRACT

An operation management apparatus includes an identification part that identifies the number of overlaps in the plurality of pieces of operation schedule data acquired by the acquisition part, and a rescheduling part that modifies a scheduled arrival time at which any of the plurality of autonomous vehicles arrive at the area to be monitored on the operation route, if the number of overlaps is equal to or greater than a threshold value, so that the number of overlaps identified by the identification part becomes less than the threshold value.

11 Claims, 8 Drawing Sheets

(56) References Cited

U.S. PATENT DOCUMENTS

| | | | | |
|---|---|---|---|---|
| 2015/0356496 | A1* | 12/2015 | Bartholomew | ................................ G06Q 10/063118 705/7.17 |
| 2016/0035223 | A1* | 2/2016 | Gutmann | .............. B60W 30/09 340/907 |
| 2018/0058296 | A1* | 3/2018 | Norton | .................. F02D 41/005 |
| 2018/0364700 | A1* | 12/2018 | Liu | ....................... G05D 1/0038 |
| 2019/0179304 | A1* | 6/2019 | Iagnemma | ............ G05D 1/0088 |
| 2020/0326714 | A1* | 10/2020 | Iwamoto | ................. G08G 1/143 |
| 2021/0041894 | A1* | 2/2021 | Urano | ................... G05D 1/0223 |
| 2021/0264784 | A1* | 8/2021 | Tatsumoto | ............. G06Q 10/02 |
| 2022/0128371 | A1* | 4/2022 | Nagata | ................ G01C 21/3461 |
| 2023/0012196 | A1* | 1/2023 | Abundis Vargas | ........................... G08G 1/096716 |
| 2023/0070046 | A1* | 3/2023 | Mizukoshi | .............. G05D 1/221 |
| 2023/0306546 | A1* | 9/2023 | Li | ........................... G06Q 50/40 |

OTHER PUBLICATIONS

Hu, Hsu-Chieh, Stephen F. Smith, and Rick Goldstein. "Cooperative schedule-driven intersection control with connected and autonomous vehicles." 2019 IEEE/RSJ International Conference on Intelligent Robots and Systems (IROS). IEEE, 2019. (Year: 2019).*

Namazi, Elnaz, Jingyue Li, and Chaoru Lu. "Intelligent intersection management systems considering autonomous vehicles: A systematic literature review." Ieee Access 7 (2019): 91946-91965. (Year: 2019).*

Cao, Zhichao, Avishai Avi Ceder, and Silin Zhang. "Real-time schedule adjustments for autonomous public transport vehicles." Transportation Research Part C: Emerging Technologies 109 (2019): 60-78. (Year: 2019).*

* cited by examiner

OPERATION MANAGEMENT APPARATUS AND OPERATION MANAGEMENT METHOD

CROSS-REFERENCE TO RELATED APPLICATIONS

The present application claims priority to Japanese Patent Applications number 2022-143861, filed on Sep. 9, 2022. The contents of these applications are incorporated herein by reference in their entirety.

BACKGROUND OF THE INVENTION

An autonomous vehicle is expected to travel without a driver inside the vehicle. It has been proposed to establish a mechanism to assign a remote monitoring person to watch the vehicle from a remote place and remotely take care of any abnormalities in the vehicle (for example, PCT International Publication No. WO 2021/192105).

BRIEF SUMMARY OF THE INVENTION

When an autonomous vehicle is in a state that requires monitoring, such as when the vehicle passes through an intersection, a monitoring person needs to pay particular attention to monitor that autonomous vehicle. There has been a problem that the monitoring person is unable to adequately monitor a plurality of autonomous vehicles when they simultaneously require monitoring.

The present disclosure focuses on this point, and an object thereof is to provide an operation management apparatus capable of preventing inadequate monitoring of autonomous vehicles by a monitoring person due to the fact that a plurality of autonomous vehicles are simultaneously in a state requiring monitoring.

MEANS FOR SOLVING THE PROBLEMS

An operation management apparatus according to a first aspect of the present disclosure includes an acquisition part that acquires a plurality of pieces of operation schedule data indicating a time period to be monitored, during which each autonomous vehicle passes through an area to be monitored that requires support of a monitoring person, the area to be monitored being on an operation route where a plurality of autonomous vehicles operate, an identification part that identifies the number of overlaps, which is the number of autonomous vehicles whose time periods to be monitored overlap with the time periods to be monitored of other autonomous vehicles, in the plurality of pieces of operation schedule data acquired by the acquisition part, and a rescheduling part that modifies a scheduled arrival time at which any of the plurality of autonomous vehicles arrive at the area to be monitored on the operation route, if the number of overlaps identified by the identification part is equal to or greater than a threshold value, so that the number of overlaps identified by the identification part becomes less than the threshold value.

An operation management method according to a second aspect of the present disclosure is an operation management method executed by a computer, the method includes the steps of acquiring a plurality of pieces of operation schedule data indicating a time period to be monitored during which each autonomous vehicle passes through an area to be monitored that requires support of a monitoring person, the area to be monitored being on an operation route where a plurality of autonomous vehicles operate, identifying the number of overlaps, which is the number of autonomous vehicles whose time periods to be monitored overlap with the time periods to be monitored of other autonomous vehicles, in the acquired plurality of pieces of operation schedule data, and modifying a scheduled arrival time at which any of the plurality of autonomous vehicles arrive at the area to be monitored on the operational route, if the identified number of overlaps is equal to or greater than a threshold value, so that the number of overlaps becomes less than the threshold value.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

Overview of Operation Management System

Figure 1:
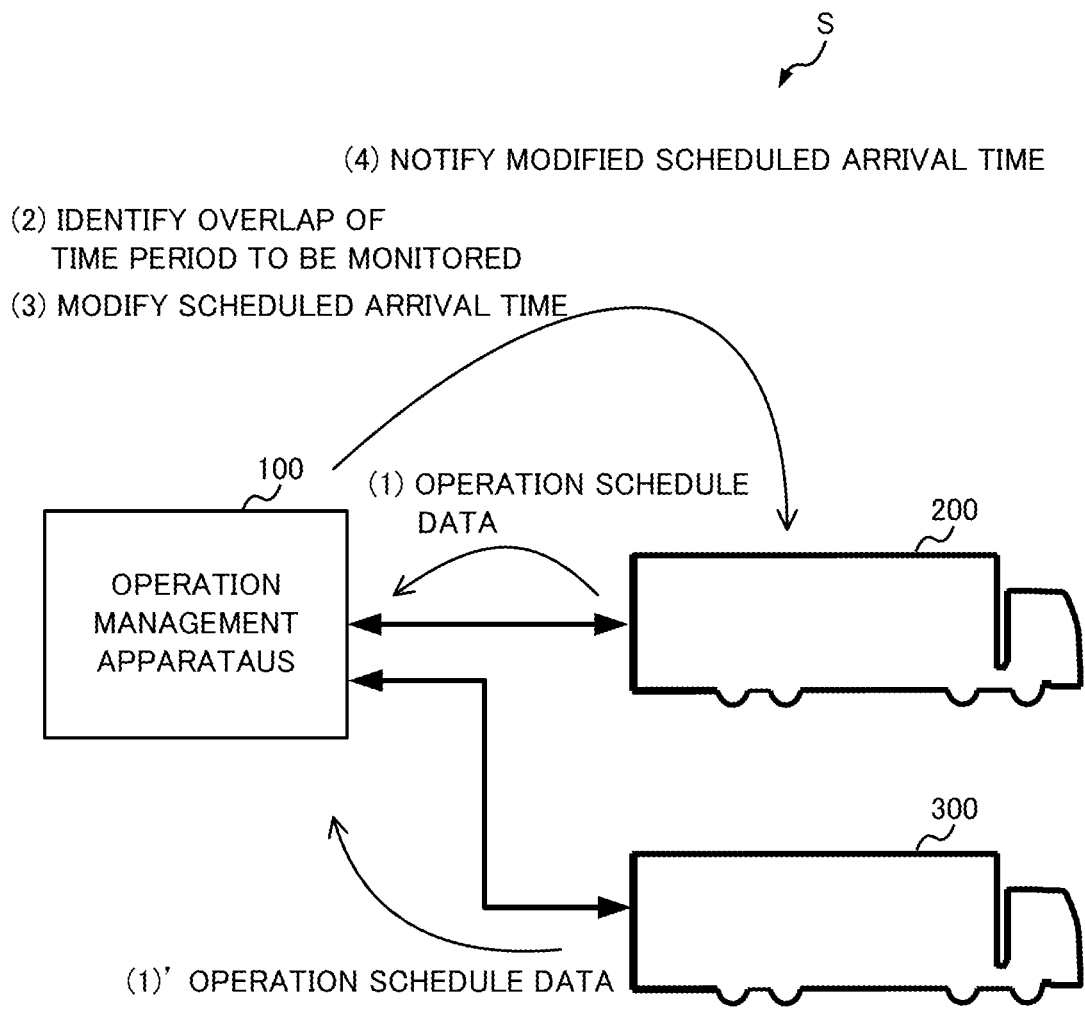
FIG. 1 shows an overview of an operation management system according to the embodiment.

FIG. 1 shows an overview of an operation management system S according to the embodiment. The operation management system S includes an operation management apparatus 100, an autonomous vehicle 200, and an autonomous vehicle 300. The operation management apparatus 100 is a server for managing operations of a plurality of autonomous vehicles 200 and 300. FIG. 1 shows an example where the operation management apparatus 100 manages the operations of two autonomous vehicles 200 and 300, but it may also manage the operations of three or more autonomous vehicles.

The operation management apparatus 100 is provided, for example, in a control room for a monitoring person who remotely monitors the operations of the plurality of autonomous vehicles 200 and 300. The operation management apparatus 100 communicates with the autonomous vehicles 200 and 300 via a network.

The following describes a procedure for managing the operations of the plurality of autonomous vehicles 200 and 300, performed by the operation management apparatus 100. First, the operation management apparatus 100 acquires respective pieces of operation schedule data from the plurality of autonomous vehicles 200 and 300 ((1) and (1)' in FIG. 1). The operation schedule data indicates a time period to be monitored from when each autonomous vehicle arrives at an area to be monitored on an operation route where the plurality of autonomous vehicles operate to when each autonomous vehicle has passed through the area to be monitored. The area to be monitored is a section that requires support of the monitoring person. For example, the area to be monitored includes an intersection, merging and diverging sections on a motorway, a toll gate, the end of a traffic jam, an accident-prone section, a sharp curve, a steep slope, a lane reduction, a width reduction, a tunnel where the accuracy of a Global Positioning System (GPS) is poor, or the like. The area to be monitored may be a predetermined section for operational safety checks of the autonomous vehicle 200 or 300.

The operation management apparatus 100 identifies the number of overlaps, which is the number of autonomous vehicles whose time periods to be monitored overlap with one or more time periods to be monitored corresponding to the plurality of autonomous vehicles 200 and 300 in the acquired operation schedule data ((2) in FIG. 1). The phrase "time periods to be monitored overlap" in the present disclosure means that at least portions of the plurality of time periods to be monitored are in the same time period. If the identified number of overlaps is equal to or greater than a threshold value, the operation management apparatus 100 modifies the scheduled arrival time at which any of the plurality of autonomous vehicles 200 and 300 arrives at the area to be monitored on its operation route so that the number of overlaps is less than the threshold value ((3) in FIG. 1). The operation management apparatus 100 notifies the autonomous vehicle 200 or 300 whose scheduled arrival time has been modified of the modified scheduled arrival time ((4) in FIG. 1).

In this way, the operation management apparatus 100 can modify the scheduled arrival time at which any of the autonomous vehicles 200 or 300 arrives at the area to be monitored so that the number of overlaps, which is the number of autonomous vehicles whose time periods to be monitored overlap with one or more time periods to be monitored corresponding to the plurality of autonomous vehicles 200 and 300, is below the threshold value. Therefore, the operation management apparatus 100 can prevent inadequate monitoring of the autonomous vehicles 200 or 300 by the monitoring person due to the fact that the plurality of autonomous vehicles 200 and 300 are simultaneously in the time period to be monitored.

Configuration of Operation Management Apparatus 100

Figure 2:
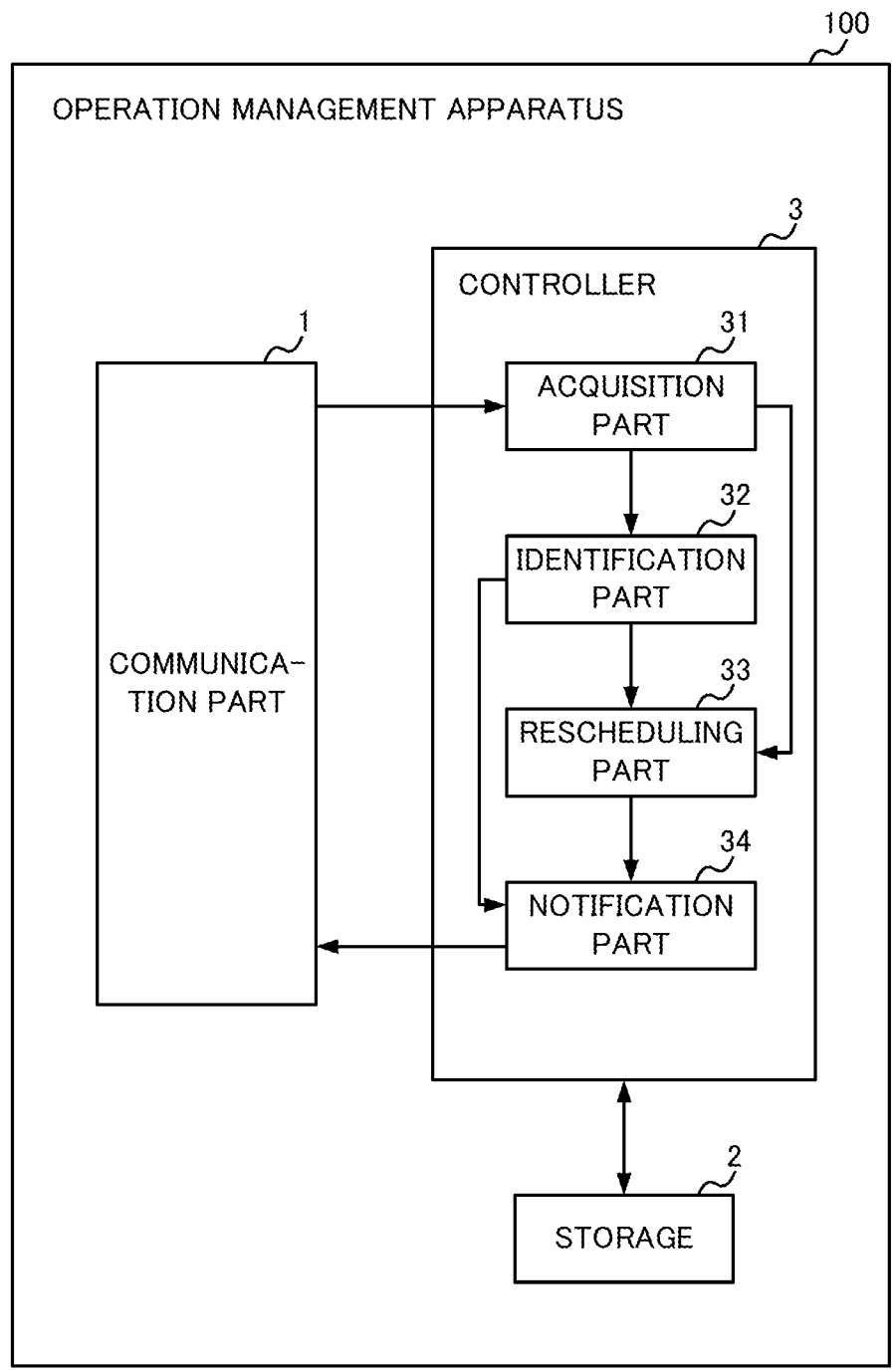
FIG. 2 shows a configuration of an operation management apparatus.

FIG. 2 shows a configuration of the operation management apparatus 100. The operation management apparatus 100 includes a communication part 1, a storage 2, and a controller 3. The controller 3 includes an acquisition part 31, an identification part 32, a rescheduling part 33, and a notification part 34.

The communication part 1 communicates with the autonomous vehicles 200 and 300 via the network. The communication part 1 inputs information such as the operation schedule data received from the autonomous vehicles 200 and 300 to the acquisition part 31.

The storage 2 includes a Read Only Memory (ROM), a Random Access Memory (RAM), and the like. The storage 2 stores various programs and various types of data for causing the controller 3 to function. The controller 3 is, for example, a Central Processing Unit (CPU). The controller 3 functions as the acquisition part 31, the identification part 32, the rescheduling part 33, and the notification part 34 by executing the program stored in the storage 2.

The acquisition part 31 acquires various types of information from the plurality of autonomous vehicles 200 and 300 via the communication part 1. For example, the acquisition part 31 acquires a plurality of pieces of operation schedule data indicating the time period to be monitored from when the autonomous vehicle 200 or 300 arrives at the area to be monitored on the operation route where the plurality of autonomous vehicles 200 and 300 operate to when each autonomous vehicle has passed through the area to be monitored. The area to be monitored is the section that requires the support of the monitoring person.

The area to be monitored includes, for example, an intersection, merging and diverging sections on a motorway, a toll gate, the end of a traffic jam, an accident-prone section, a sharp curve, a steep slope, a lane reduction, a width reduction, a tunnel where the accuracy of a Global Positioning System (GPS) is poor, or the like. The area to be monitored may be a predetermined section for operational safety checks of the autonomous vehicle 200 or 300. If the area to be monitored that requires the monitoring person's support arises due to an event such as a traffic jam, an accident, or the like, the acquisition part 31 may acquire the operation schedule data reflecting the area to be monitored in which this event occurred.

Figure 3:
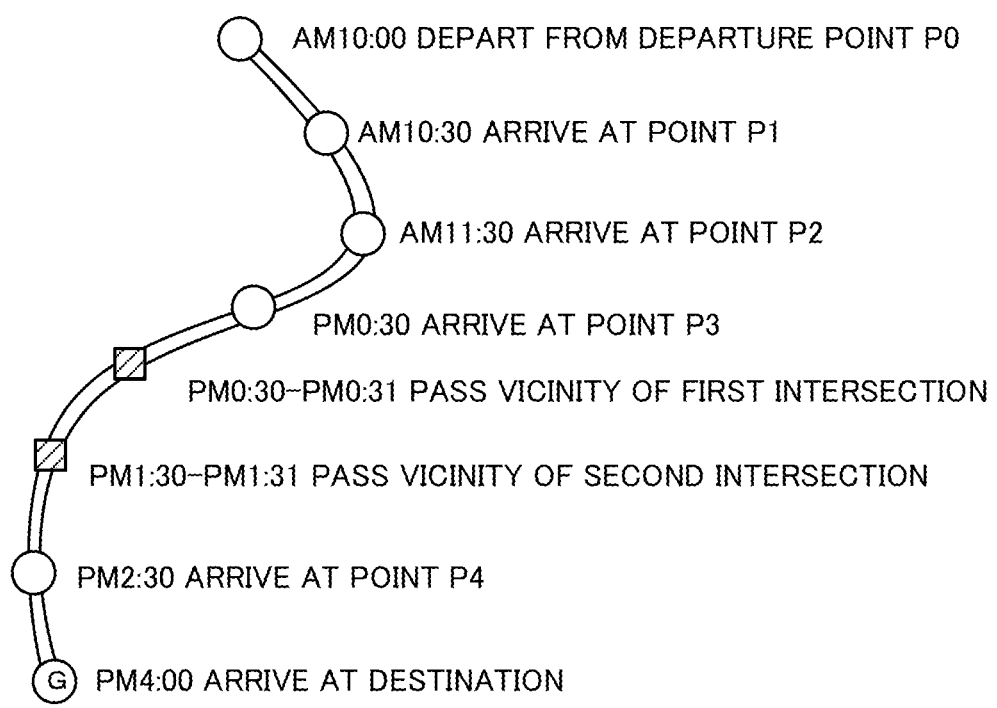
FIG. 3 shows an example of operation schedule data.

FIG. 3 shows an example of the operation schedule data. In the example of FIG. 3, the operation schedule data indicates the operation route of the autonomous vehicle 200. Circles on the operational route indicate a departure point P0, a destination G, and a plurality of points P1 to P4 where the autonomous vehicle 200 will pass through on the operational route. Hatched squares on the operation route indicate the areas to be monitored. The operation schedule data indicates, in addition to the operation route, the time at which the autonomous vehicle departs from the departure point P0, and respective times at which the autonomous vehicle arrives at the plurality of points P1 to P4 and the destination G.

In the example of FIG. 3, the operation schedule data indicates that the autonomous vehicle 200 departs from the departure point P0 at "10:00 am," arrives at the point P1 at "10:30 am," and then travels via the point P2 through the point P4 to arrive at the destination G at the scheduled arrival time "4:00 pm." The operation schedule data indicates the time period to be monitored from the scheduled arrival time "0:30 pm" when the autonomous vehicle 200 arrives at the vicinity of a first intersection, which is the area to be monitored, to the time "0:31 pm" when the autonomous vehicle 200 has passed through and left the vicinity of the first intersection.

The operation schedule data may further indicate information indicating the speed at which the autonomous vehicle 200 travels at or between each point on the operation route. The acquisition part 31 acquires, from the autonomous vehicle 200 or 300, identification information for identifying the autonomous vehicle 200 or 300 together with the operation schedule data.

Before acquiring the operation schedule data, the acquisition part 31 acquires information indicating a changeover time at which the monitoring person who remotely monitors the plurality of autonomous vehicles 200 or 300 changes. For example, the acquisition part 31 acquires the information indicating the changeover time from an information terminal of the monitoring person or the information terminal (not shown in figures) of an administrator who manages the monitoring person.

The acquisition part 31 may acquire information indicating the number of people riding on each of the plurality of autonomous vehicles 200 and 300. Further, the acquisition part 31 may acquire information indicating attributes of passengers riding on each of the autonomous vehicles 200 or 300. The attribute of a passenger is, for example, the age group of the passenger. The acquisition part 31 acquires, from the autonomous vehicle 200 or 300, the identification information of the autonomous vehicle 200 or 300 in addition to the information indicating the number of people riding on the vehicle or the information indicating the attributes of the passengers. The acquisition part 31 outputs the acquired operation schedule data and the identification information of the autonomous vehicle 200 or 300 to the identification part 32 and the rescheduling part 33.

Identification of Overlaps

Figure 4:
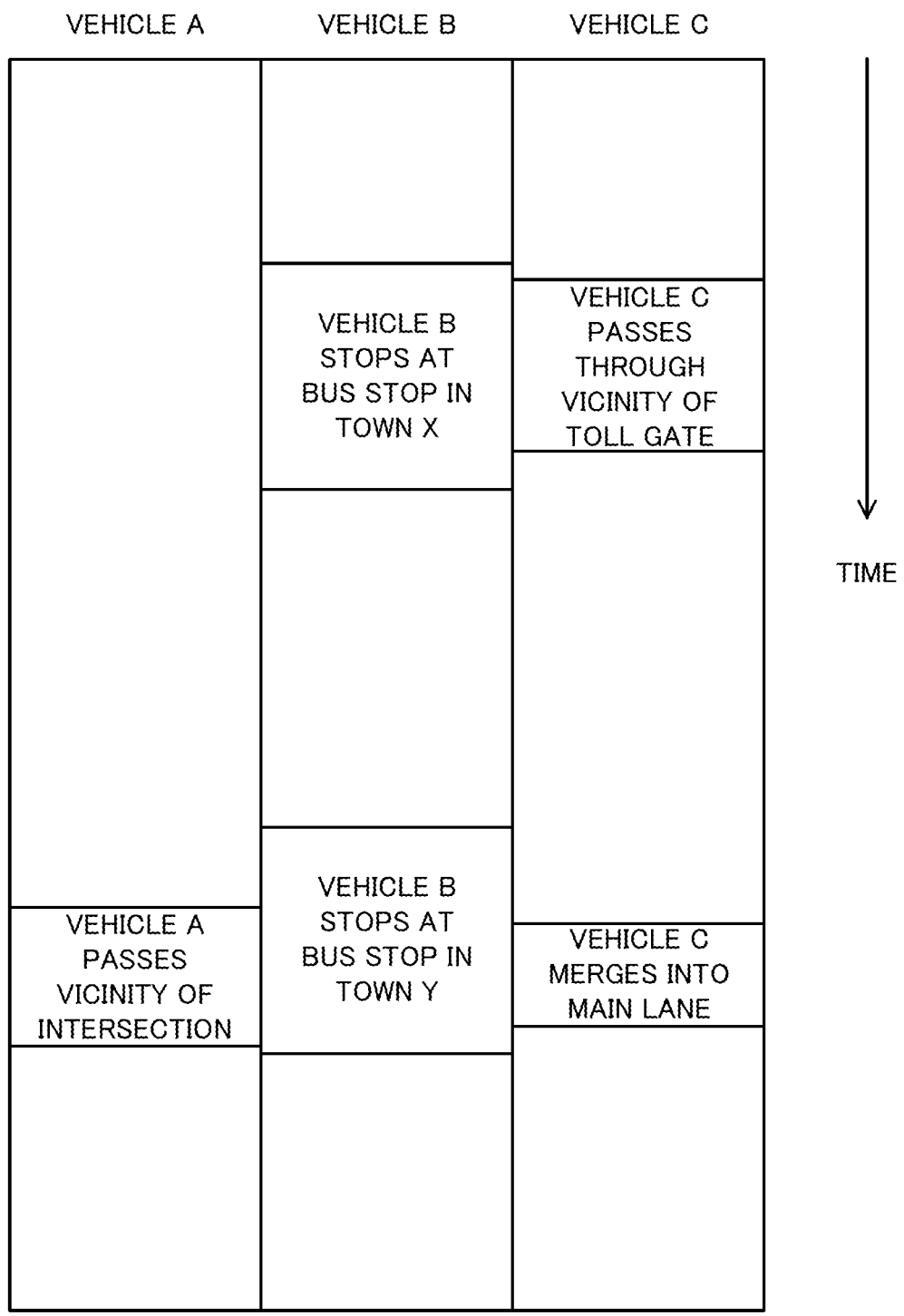
FIG. 4 is a diagram for explaining a method for identifying the number of overlaps, performed by an identification part.

The identification part 32 identifies the number of overlaps, which is the number of autonomous vehicles whose time periods to be monitored overlap with one or more time periods to be monitored corresponding to the plurality of autonomous vehicles 200 and 300, in the plurality of pieces of schedule data acquired by the acquisition part 31. FIG. 4 is a diagram for explaining a method for identifying the number of overlaps, performed by the identification part 32. FIG. 4 shows an example of the time periods to be monitored of "a vehicle A," "a vehicle B," and "a vehicle C" which are autonomous vehicles. The vertical axis of FIG. 4 represents time.

For example, the vehicle A passes through "the vicinity of an intersection," which is an area to be monitored. From the time when the vehicle A arrives at "the vicinity of the intersection" to when it has passed through and left "the vicinity of the intersection" is the time period to be monitored corresponding to the vehicle A. The vehicle B stops at a "bus stop in town X," which is an area to be monitored. From the time when the vehicle B arrives at the vicinity of the "bus stop in town X" to when it has passed through and left the vicinity of the "bus stop in town X" is a first time period to be monitored corresponding to the vehicle B. From the time when the vehicle B arrives at the vicinity of a "bus stop in town Y" to when it has passed through and left the vicinity of the "bus stop in town Y" is a second time period to be monitored corresponding to the vehicle B.

The vehicle C passes through "the vicinity of a toll gate" on a motorway, which is an area to be monitored. From the time when the vehicle C arrives at "the vicinity of the toll gate" to when it has passed through and left "the vicinity of the toll gate" is a first time period to be monitored corresponding to the vehicle C. From the time when the vehicle C arrives at the vicinity of a merging section of an acceleration lane with a main lane of the motorway to when it merges into the main lane is a second time period to be monitored corresponding to the vehicle C.

In the example shown in FIG. 4, the first time period to be monitored in which the vehicle B stops at the "bus stop in town X" and the first time period to be monitored in which the vehicle C passes through "the vicinity of the toll gate" overlap with each other. On the other hand, the time period in which the first time period to be monitored of the vehicle B and the first time period to be monitored of the vehicle C overlap with each other does not overlap with the time period to be monitored of the vehicle A. Therefore, the identification part 32 identifies that the number of overlaps is "2," since the time periods to be monitored of two out of the autonomous vehicles, "the vehicle A," "the vehicle B," and "the vehicle C," overlap with each other in this overlapping time period.

The time period to be monitored in which the vehicle A passes through "the vicinity of the intersection," the second time period to be monitored in which the vehicle B stops at the "bus stop in town Y," and the second time period to be monitored in which the vehicle C merges into the main lane overlap with each other. The identification part 32 identifies that the number of overlaps is "3," since the time periods to be monitored of all three autonomous vehicles, "the vehicle A," "the vehicle B," and "the vehicle C," overlap with each other in this overlapping time period. The identification part 32 outputs information indicating the identified number of overlaps to the rescheduling part 33 and the notification part 34.

Modification of Scheduled Arrival Time

The rescheduling part 33 modifies the scheduled arrival time at which any of the plurality of autonomous vehicles 200 and 300 arrive at the area to be monitored on the operation route. The rescheduling part 33 modifies the scheduled arrival time at which the autonomous vehicle arrives at the area to be monitored on the operation route by changing the operation route or traveling speed of any of the plurality of autonomous vehicles 200 and 300. The rescheduling part 33 may adjust a time during which any of the autonomous vehicles 200 and 300 stop at a parking lot or the like along the operation route for the purpose of modifying the scheduled arrival time at which the autonomous vehicles 200 and 300 arrive at the areas to be monitored on the operation routes. For example, the rescheduling part 33 may adjust the time during which any of the autonomous vehicles 200 and 300 stop so as to delay or advance the scheduled arrival time of the autonomous vehicle 200 or 300.

If the number of overlaps identified by the identification part 32 is equal to or greater than the threshold value, the rescheduling part 33 modifies the scheduled arrival time of any of the plurality of autonomous vehicles 200 and 300, whose time period to be monitored overlaps with the time periods to be monitored of other autonomous vehicles, at the area to be monitored on its operation route so that the number of overlaps becomes less than the threshold value. The threshold value is, for example, a value determined according to the number of monitoring persons who remotely monitor the plurality of autonomous vehicles 200 and 300. On the other hand, the rescheduling part 33 does not modify the scheduled arrival time at which any of the plurality of autonomous vehicles 200 and 300 arrive at the area to be monitored on its operational route if the number of overlaps identified by the identification part 32 is less than the threshold value.

Figure 5:
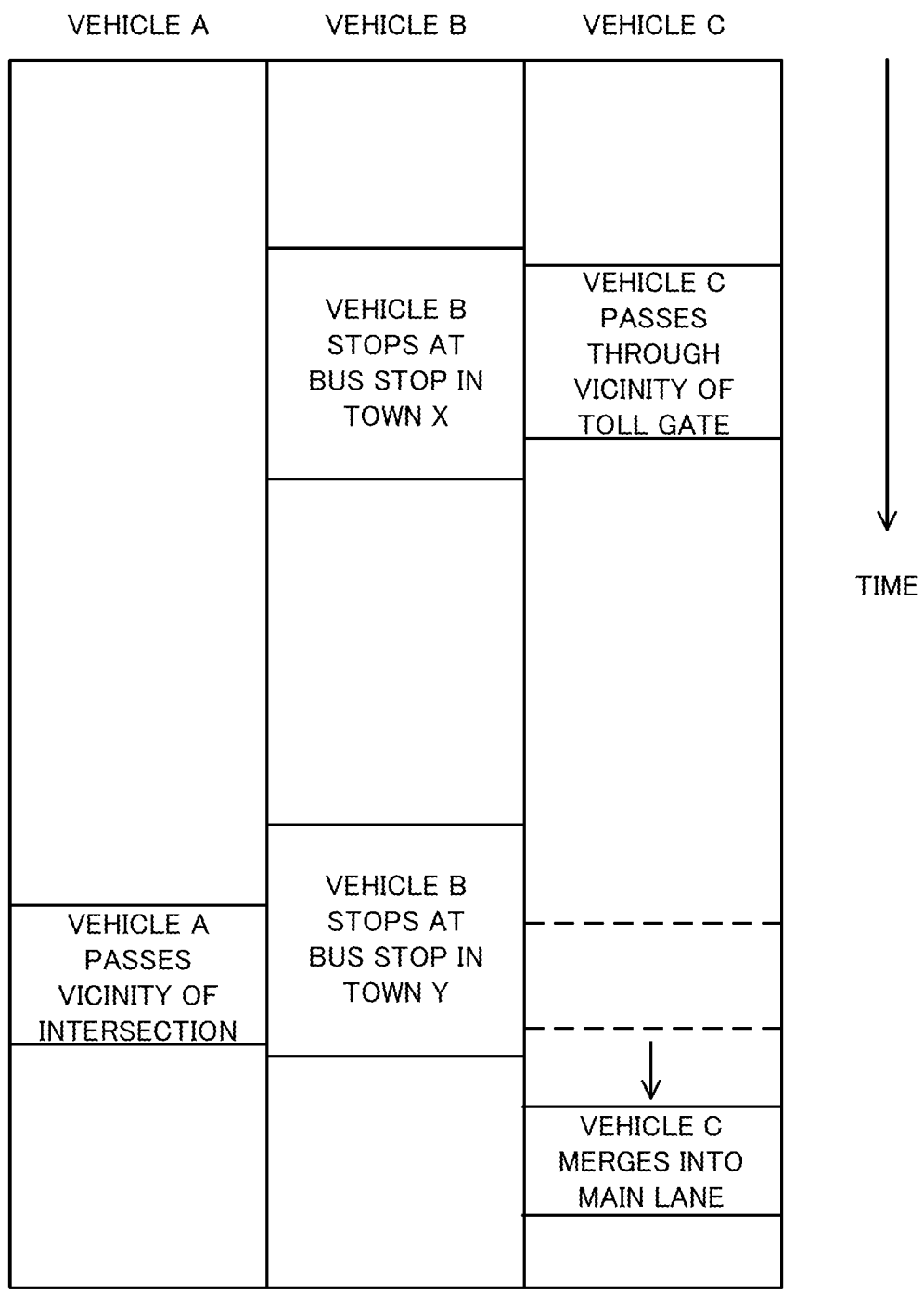
FIG. 5 shows an example of a modification of a scheduled arrival time by a rescheduling part.

FIG. 5 shows an example of a modification of the scheduled arrival time by the rescheduling part 33. FIG. 5 shows the second time period to be monitored for the vehicle C to merge into the main lane shown in FIG. 4, after being modified by the rescheduling part 33. In the examples in FIGS. 4 and 5, the threshold value for determining whether or not the rescheduling part 33 needs to modify the scheduled arrival time is 3.

The rescheduling part 33 determines that the number of overlaps "2" identified by the identification part 32 is less than the threshold value during the time period in which the vehicle C passes through the toll gate, and so does not delay the scheduled arrival time at which the vehicle B or the vehicle C arrives at the area to be monitored. On the other hand, the rescheduling part 33 determines that the number of overlaps "3" identified by the identification part 32 is equal to or greater than the threshold value during the time period in which the vehicle C merges into the main lane, and modifies the schedule of at least any of the vehicle A, the vehicle B, or the vehicle C. In the example shown in FIG. 5, the rescheduling part 33 delays the time period to be monitored for the vehicle C to merge into the main lane of the motorway so that it does not overlap with the time period to be monitored when the vehicle B stops at the "bus stop in town Y."

When the rescheduling part 33 delays the scheduled arrival time at which the autonomous vehicle 200 or 300 arrives at a first area to be monitored by a first delay time, it may delay the arrival time at which the same autonomous vehicle arrives at a second area to be monitored, which the autonomous vehicle reaches after the first area to be monitored, by a second delay time. The second delay time is smaller than the first delay time.

Figure 6:
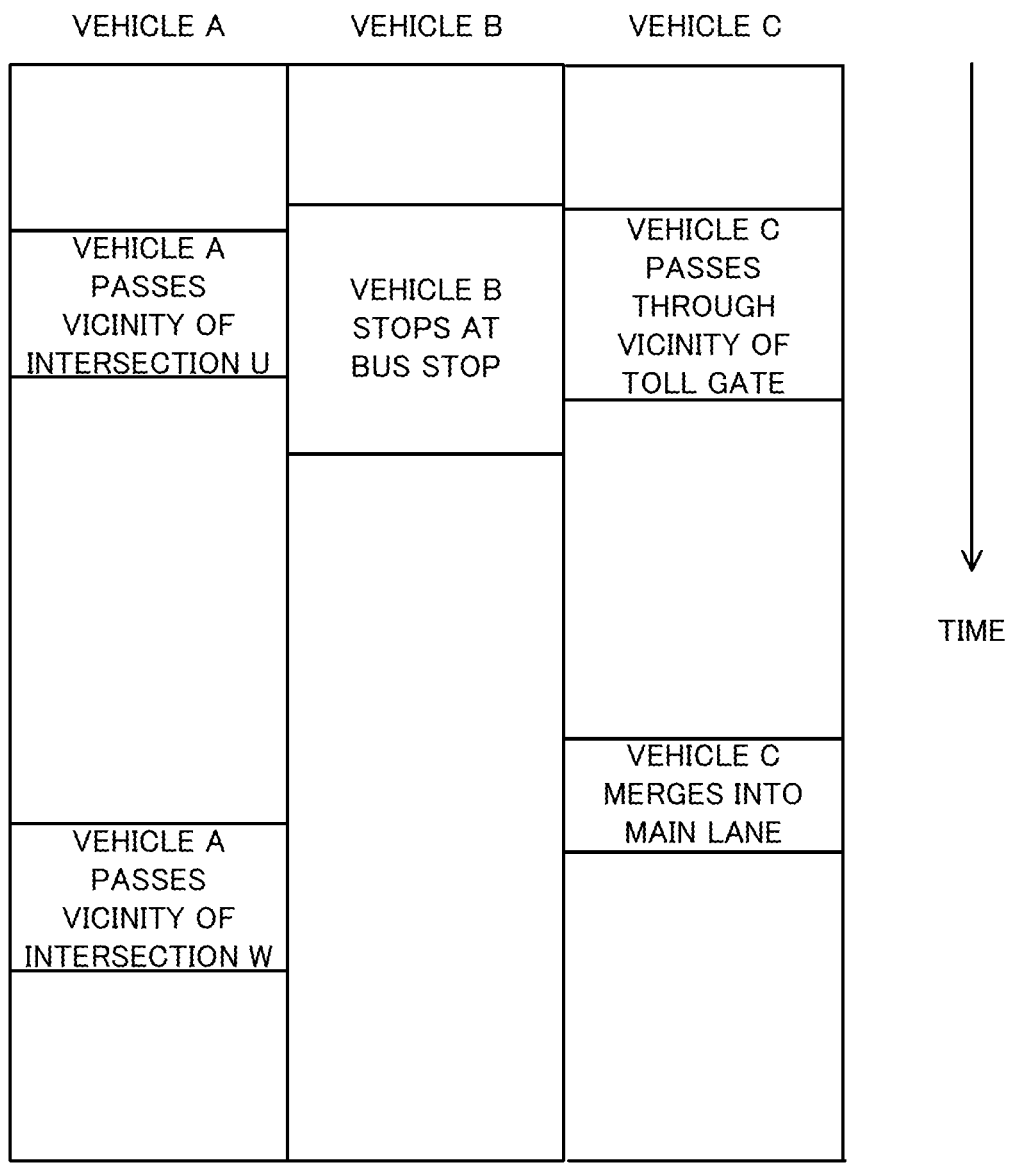
FIG. 6 shows another example of the modification of the scheduled arrival time of a vehicle by the rescheduling part.
Figure 7:
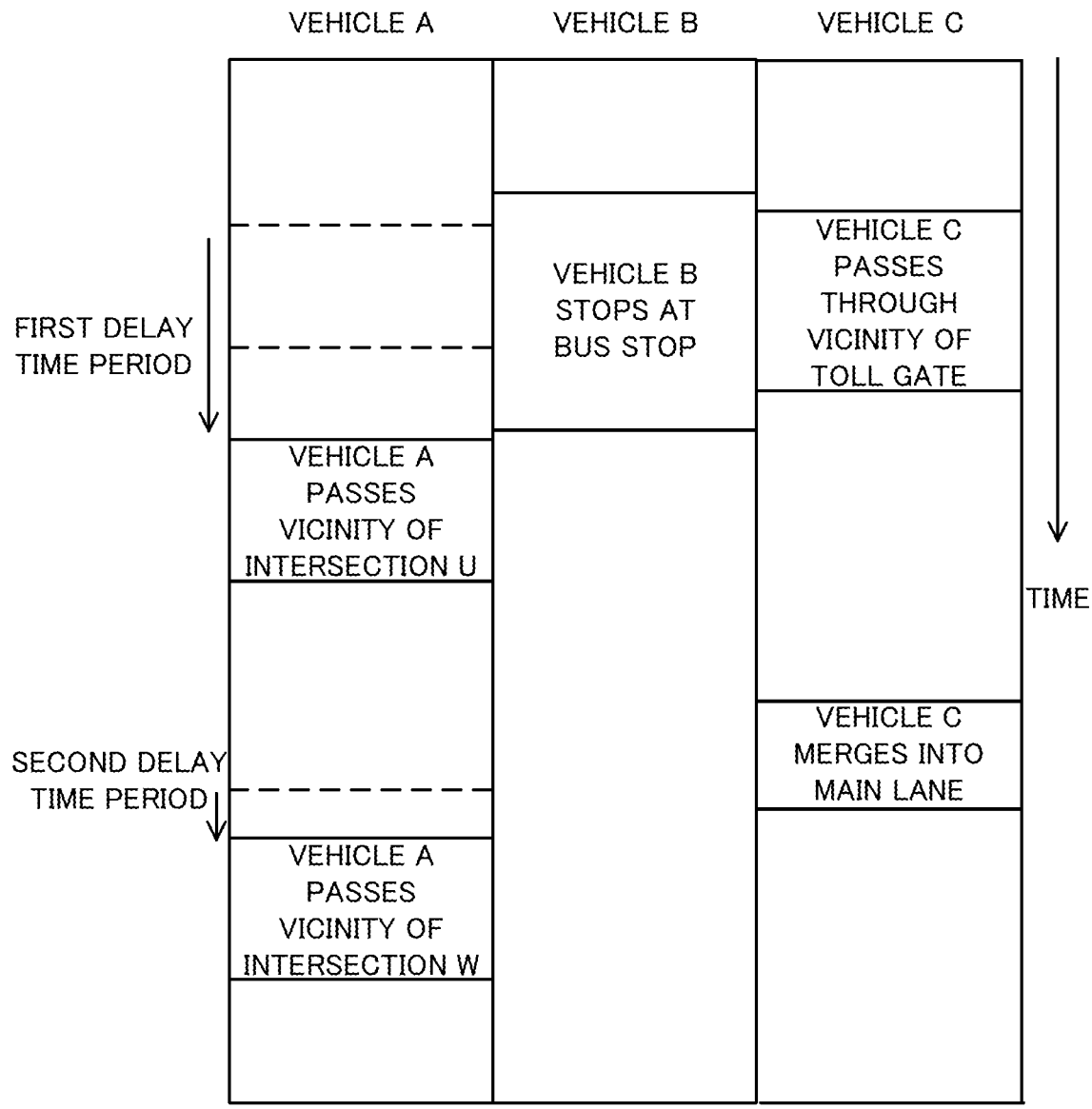
FIG. 7 shows another example of the modification of the scheduled arrival time of the vehicle by the rescheduling part.

FIGS. 6 and 7 show other examples of the modifications of the scheduled arrival time of the vehicle A by the rescheduling part 33. In the examples of FIGS. 6 and 7, the threshold value for determining whether or not the rescheduling part 33 needs to modify the scheduled arrival time is 3. In the example of FIG. 6, the identification part 32 identifies that the number of overlaps is "3" in the first time period to be monitored when the vehicle A passes through "the vicinity of an intersection U." Due to determining that the number of overlaps "3" identified by the identification part 32 is equal to or greater than the threshold value (the threshold value in the example of FIG. 6 is 3), the rescheduling part 33 delays the scheduled arrival time at which the vehicle A arrives at the area to be monitored "the vicinity of the intersection U" by the first delay time (see FIG. 7).

In the example of FIG. 7, if the scheduled arrival time for the vehicle A to arrive at the area to be monitored "the vicinity of the intersection U" is delayed by the first delay time, the rescheduling part 33 increases the travelling speed at which the vehicle A travels from the vicinity of the intersection U to the vicinity of the intersection W to be greater than the travelling speed that was scheduled before the scheduled arrival time for the vehicle A to arrive at the area to be monitored "the vicinity of the intersection U" was delayed. In this way, as shown in FIG. 7, the rescheduling part 33 delays the scheduled arrival time at which the vehicle A arrives at the area to be monitored "the vicinity of the intersection W" by the second delay time. The rescheduling part 33 can reduce the impact that the delay in the scheduled arrival time of the vehicle A in the area to be monitored "the vicinity of the intersection U" has on the operation of the vehicle A in the subsequent operational route.

Setting Priority

If the number of overlaps identified by the identification part 32 is equal to or greater than the threshold value, the rescheduling part 33 modifies the scheduled arrival time of the autonomous vehicle 200 or 300 to which a first-level priority is set, out of the plurality of autonomous vehicles 200 and 300 whose time periods to be monitored overlap with each other at the same time period, with higher priority than the scheduled arrival time of the autonomous vehicle to which a second-level priority is set. The priority level indicates the degree to which the modification in the arrival time of the autonomous vehicle 200 or 300 is prioritized over the modification in the arrival time of other autonomous vehicles. The second-level priority is the priority level set to the autonomous vehicle with a lower priority for modifying the arrival time of the autonomous vehicle compared to the first-level priority.

The rescheduling part 33 sets the priorities to the plurality of autonomous vehicles 200 and 300 respectively, before modifying the scheduled arrival time at which any of the plurality of autonomous vehicles 200 or 300 arrives at the area to be monitored. The following is a method of setting the priority performed by the rescheduling part 33.

The difference in the number of passengers causes a difference in the magnitude of the impact exerted by the delay. Therefore, the rescheduling part 33 sets the priorities to the plurality of autonomous vehicles 200 and 300 respectively, on the basis of the information indicating the number of passengers in each of the plurality of autonomous vehicles 200 and 300 acquired by the acquisition part 31.

If the rescheduling part 33 delays the scheduled arrival time of the autonomous vehicle 200 or 300 with a larger number of passengers, a larger number of passengers will be affected by the delay as compared with the case where the rescheduling part 33 delays the scheduled arrival time of an autonomous vehicle with a smaller number of passengers. For this reason, the rescheduling part 33 sets a higher priority level for modifying the arrival time to the autonomous vehicle 200 or 300 with a first number of passengers than to the autonomous vehicle with a second number of passengers, which is a larger number than the first number. In this way, the rescheduling part 33 can minimize as much as possible the impact on passengers or the like caused by delaying the scheduled arrival time of the autonomous vehicle 200 or 300.

Traffic facilities such as buses function as essential transport infrastructure in the lives of people who have difficulty with transportation, such as children and the elderly. The rescheduling part 33 may set the priorities to the plurality of autonomous vehicles 200 and 300 on the basis of the attributes such as the ages of the passengers. For example, the rescheduling part 33 may refer to the information indicating the attributes of the passengers in each of the autonomous vehicles 200 and 300 acquired by the acquisition part 31 and set the higher priority level for modifying the scheduled arrival time to the autonomous vehicles in which the average age of the passengers is between 18 and 65 years old, compared to the autonomous vehicles in which the average age of the passengers is under 18 years old.

Similarly, the rescheduling part 33 may set the higher priority level to the autonomous vehicle 200 or 300 in which the average age of the passengers is between 18 and 65 years old, compared to the autonomous vehicles in which the average age of the passengers is 65 years old or older. In this way, the rescheduling part 33 can limit the impact on the functioning of the transport infrastructure caused by the delay of the scheduled arrival time of any of the plurality of autonomous vehicles 200 and 300.

If the rescheduling part 33 delays the scheduled arrival time of the same autonomous vehicle 200 to the area to be monitored more than once, a disadvantage for the user of that autonomous vehicle 200 will become greater. Therefore, the rescheduling part 33 may set a priority level to the autonomous vehicle 200 or 300 for which the scheduled arrival time to any of the areas to be monitored on the operation route has been delayed to be lower than the priority level set to the autonomous vehicle for which the scheduled arrival time to any of the areas to be monitored on the operation route has not been delayed. In this way, the rescheduling part 33 can limit the significant impact on the user of the autonomous vehicle 200 or 300 caused by a plurality of delays in the scheduled arrival time of any of the plurality of autonomous vehicles 200 and 300.

If an urgent area to be monitored that requires a monitoring person's quick support arises due to an event such as an accident, a traffic jam, or the like, there is a risk of delay of the time at which the autonomous vehicle 200 or 300, arriving at this area to be monitored, arrives at its destination. For this reason, the rescheduling part 33 may set a higher priority level for modifying the scheduled arrival time to the autonomous vehicle which arrives at the non-urgent area to be monitored than to the autonomous vehicle 200 or 300 which arrives at the urgent area to be monitored. In this way, it is possible to suppress an increase in the delay of the time at which the autonomous vehicle 200 or 300, which arrives at the urgent area to be monitored, arrives at its destination.

Modification of Scheduled Arrival Time Based on Changeover Time

Because the number of monitoring persons who remotely monitor the vehicles temporarily decreases at the changeover time at which a monitoring person changes, there is a risk that the monitoring person is not be able to take care of unforeseen situations if the changeover time overlaps with the time period to be monitored of the autonomous vehicle. For this reason, if the changeover time overlaps with any of the plurality of time periods to be monitored acquired by the acquisition part 31, the rescheduling part 33 may modify the scheduled arrival time at which the autonomous vehicle 200 or 300 arrives at the area to be monitored corresponding to the time period to be monitored overlapping with the changeover time, such that the changeover time does not overlap with the time period to be monitored.

For example, if the changeover time is 3:00 pm and the time period to be monitored of the autonomous vehicle 200 is between 2:30 pm and 3:30 pm, the changeover time and the time period to be monitored of the autonomous vehicle 200 overlap with each other. At this time, the rescheduling part 33 delays the scheduled arrival time of the autonomous vehicle 200 to the area to be monitored corresponding to this time period to be monitored by 45 minutes, so that the time period to be monitored of the autonomous vehicle 200 is from 3:15 pm to 4:15 pm. In this way, the rescheduling part 33 can reduce the risk that the monitoring person cannot take care of unforeseen events due to a temporary reduction of the number of monitoring persons during the changeover time.

Notification of Various Types of Information

The notification part 34 communicates with the plurality of autonomous vehicles 200 and 300 via the communication part 1. The notification part 34 notifies the autonomous vehicle 200 or 300 whose scheduled arrival time has been modified by the rescheduling part 33 of the modified scheduled arrival time. The scheduled arrival time provided in the notification is used for the autonomous vehicle 200 or 300 to create new operation schedule data, and the autonomous vehicle 200 or 300 travels on the basis of the created operation schedule data.

If the number of overlaps identified by the identification part 32 is greater than a reference value, the notification part 34 provides notification of predetermined information to the monitoring person of the autonomous vehicle 200 or 300 whose time period to be monitored overlaps with the time periods to be monitored of other autonomous vehicles. The reference value is a value smaller than the threshold value. The predetermined information is, for example, a message to caution the monitoring person that the number of time periods to be monitored of the autonomous vehicle 200 or 300 that overlap with the time periods to be monitored of other autonomous vehicles is close to the threshold value. In this way, the notification part 34 can caution the monitoring person that the number of overlaps is close to the threshold value, if the number of overlaps is close to the threshold value even though the rescheduling part 33 has modified the scheduled arrival time.

The notification part 34 notifies the monitoring person that this autonomous vehicle 200 or 300 requires the monitoring person's support before the autonomous vehicle 200 or 300 arrives at the area to be monitored. In this way, the notification part 34 can prevent the monitoring person from overlooking that the autonomous vehicle 200 or 300 has arrived at the area to be monitored that requires the monitoring person's support.

Procedure for Modifying Scheduled Arrival Time by Operation Management Apparatus 100

Figure 8:
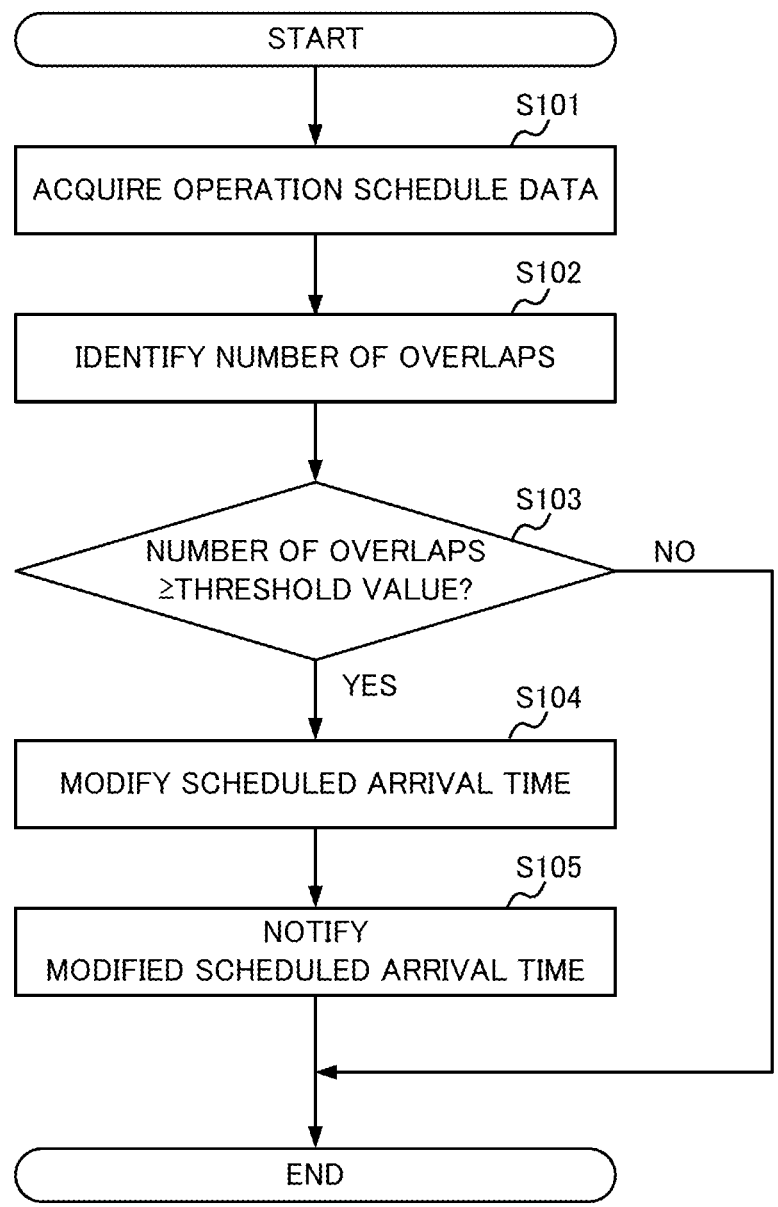
FIG. 8 is a flowchart showing a procedure for modifying the scheduled arrival time of an autonomous vehicle, performed by the operation management apparatus.

FIG. 8 is a flowchart showing a procedure for modifying the scheduled arrival time of the autonomous vehicle 200 or 300, performed by the operation management apparatus 100. This procedure starts before any of the plurality of autonomous vehicles 200 or 300 departs from the departure point.

First, the acquisition part 31 acquires a plurality of pieces of operation schedule data indicating the time period to be monitored from when the autonomous vehicle 200 or 300 arrives at the area to be monitored on the operation route where the plurality of autonomous vehicles 200 and 300 operate to when it has passed through this area to be monitored (step S101). The identification part 32 identifies the number of overlaps, which is the number of autonomous vehicles whose time periods to be monitored overlap with one or more time periods to be monitored corresponding to the plurality of autonomous vehicles 200 and 300, in the operation schedule data acquired by the acquisition part 31 (step S102). The rescheduling part 33 determines whether or not the number of overlaps identified by the identification part 32 is equal to or greater than the threshold value (step S103). If the rescheduling part 33 determines that the number of overlaps identified by the identification part 32 is equal to or greater than the threshold value (YES in step S103), the rescheduling part 33 modifies the scheduled arrival time at which any of the plurality of autonomous vehicles 200 and 300 arrive at the area to be monitored on its operational route so that the number of overlaps becomes less than the threshold value (step S104).

The notification part 34 provides notification of the modified scheduled arrival time to the autonomous vehicle 200 or 300 whose scheduled arrival time has been modified by the rescheduling part 33 (step S105), and terminates the process. If the rescheduling part 33 determines that the number of overlaps identified by the identification part 32 in the determination of step S103 is less than the threshold value (NO in step S103), the process is terminated without modifying the scheduled arrival time of the autonomous vehicle 200 or 300.

Effects of Operation Management Apparatus 100 of Present Disclosure

The rescheduling part 33 can modify the scheduled arrival time at which either the autonomous vehicle 200 or 300 arrives at the area to be monitored so that the number of overlaps, which is the number of autonomous vehicles whose time periods to be monitored overlap with one or more time periods to be monitored of other autonomous vehicles, is less than the threshold value. Therefore, the rescheduling part 33 can prevent inadequate monitoring of the autonomous vehicles 200 and 300 by the monitoring person due to the fact that the plurality of autonomous vehicles are simultaneously in the time period to be monitored.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The invention claimed is:

1. An operation management apparatus comprising:
an acquisition part that acquires a plurality of pieces of operation schedule data indicating a time period to be monitored, during which each autonomous vehicle passes through an area to be monitored that requires support of a monitoring person, the area to be monitored being on an operation route where a plurality of autonomous vehicles operate;
an identification part that identifies a number of overlaps, which is a number of autonomous vehicles whose time periods to be monitored overlap with the time periods to be monitored of other autonomous vehicles, in the plurality of pieces of operation schedule data acquired by the acquisition part; and
a rescheduling part that modifies a scheduled arrival time at which any of the plurality of autonomous vehicles arrive at the area to be monitored on the operation route, by sending a command to modify any of speed and the operation route of one or more of the plurality of autonomous vehicles, if the number of overlaps identified by the identification part is equal to or greater than a threshold value, so that the number of overlaps identified by the identification part becomes less than the threshold value.

2. The operation management apparatus according to claim 1 further comprising:
a notification part that notifies the monitoring person of the autonomous vehicle of predetermined information if the number of overlaps identified by the identification part is larger than a reference value which is smaller than the threshold value.

3. The operation management apparatus according to claim 1, wherein
the acquisition part further acquires a changeover time at which a monitoring person changes, and
the rescheduling part modifies the scheduled arrival time at which the autonomous vehicle arrives at the area to be monitored corresponding to the time period to be monitored that overlaps with the changeover time so that the changeover time does not overlap with the time period to be monitored, if the changeover time overlaps with any of the plurality of time periods to be monitored acquired by the acquisition part.

4. The operation management apparatus according to claim 1 further comprising:
a notification part that notifies the monitoring person that the autonomous vehicle requires the support for the autonomous vehicle, before the autonomous vehicle arrives at the area to be monitored.

5. The operation management apparatus according to claim 1, wherein
when the rescheduling part delays the scheduled arrival time at which the autonomous vehicle arrives at a first area to be monitored by a first delay time, the rescheduling part delays the scheduled arrival time at which the autonomous vehicle arrives at a second area to be monitored, which the autonomous vehicle reaches after the first monitoring area, by a second delay time that is smaller than the first delay time.

6. The operation management apparatus according to claim 1, wherein
if the number of overlaps identified by the identification part is equal to or greater than a threshold value, the rescheduling part modifies the scheduled arrival time of the autonomous vehicle to which a first-level priority is set, out of the plurality of autonomous vehicles whose time periods to be monitored overlap with each other at the same time period, with higher priority than the scheduled arrival time of the autonomous vehicle to which a second-level priority is set.

7. The operation management apparatus according to claim 6, wherein
the acquisition part acquires information indicating a number of passengers in each of the plurality of autonomous vehicles, and
the rescheduling part sets a higher priority level to the autonomous vehicle with a first number of passengers than to the autonomous vehicle with a second number of passengers which is greater than the first number of passengers.

8. The operation management apparatus according to claim 6, wherein
the rescheduling part sets a lower priority level to the autonomous vehicle whose scheduled arrival time has been delayed than to the autonomous vehicle whose scheduled arrival time has not been delayed.

9. The operation management apparatus according to claim 6, wherein
the acquisition part acquires information indicating an attribute of a passenger on each of the autonomous vehicles, and
the rescheduling part sets the priority level to the autonomous vehicle on the basis of the attribute of the passenger.

10. The operation management apparatus according to claim 9, wherein
the acquisition part acquires information indicating an average age of the passengers in each of the autonomous vehicles as the attribute of the passenger, and
the rescheduling part sets, to the autonomous vehicle with the passengers having a higher average age, the first-level priority or the second-level priority that is higher than the first-level priority or the second-level priority of the autonomous vehicle with the passengers having a lower average age.

11. An operation management method executed by a computer, the method comprising:
acquiring a plurality of pieces of operation schedule data indicating a time period to be monitored during which each autonomous vehicle passes through an area to be monitored that requires support of a monitoring person, the area to be monitored being on an operation route where a plurality of autonomous vehicles operate;

identifying a number of overlaps, which is a number of autonomous vehicles whose time periods to be monitored overlap with the time periods to be monitored of other autonomous vehicles, in the acquired plurality of pieces of operation schedule data; and modifying a scheduled arrival time at which any of the plurality of autonomous vehicles arrive at the area to be monitored on the operation route, by sending a command to modify any of speed and the operation route of one or more of the plurality of autonomous vehicles, if the identified number of overlaps is equal to or greater than a threshold value, so that the number of overlaps becomes less than the threshold value.

\* \* \* \* \*